(12) United States Patent
Bartl et al.

(10) Patent No.: US 12,287,066 B2
(45) Date of Patent: Apr. 29, 2025

(54) PRESSURE VESSEL, PRESSURE VESSEL SYSTEM, AND MOTOR VEHICLE HAVING FUEL RAIL

(71) Applicant: Bayerische Motoren Werke Aktiengesellschaft, Munich (DE)

(72) Inventors: Peter Bartl, Munich (DE); Timo Gutmann, Bad Kohlgrub (DE); Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/024,329

(22) PCT Filed: Sep. 3, 2021

(86) PCT No.: PCT/EP2021/074341
§ 371 (c)(1),
(2) Date: Mar. 2, 2023

(87) PCT Pub. No.: WO2022/049230
PCT Pub. Date: Mar. 10, 2022

(65) Prior Publication Data
US 2023/0332750 A1 Oct. 19, 2023

(30) Foreign Application Priority Data
Sep. 3, 2020 (DE) .............. 10 2020 123 037.0

(51) Int. Cl.
*F17C 13/12* (2006.01)
(52) U.S. Cl.
CPC ...... *F17C 13/123* (2013.01); *F17C 2205/013* (2013.01); *F17C 2205/0352* (2013.01); *F17C 2270/0168* (2013.01)

(58) Field of Classification Search
CPC .............. F17C 13/123; F17C 2205/013; F17C 2205/0352; F17C 2270/0168;
(Continued)

(56) References Cited

U.S. PATENT DOCUMENTS 3,847,173 A * 11/1974 Hill ......................... F17C 5/002
137/870
4,331,175 A * 5/1982 Brake ................... F17C 13/084
222/509

(Continued)

FOREIGN PATENT DOCUMENTS

AT 505960 A1 * 5/2009 ........... F02D 19/022
DE 92 09 141 U1 9/1992
(Continued)

OTHER PUBLICATIONS

AT-505960-A1 English Translation of Specification (Year: 2024).*
(Continued)

*Primary Examiner* — Timothy P. Kelly
*Assistant Examiner* — Stephanie A Shrieves
(74) *Attorney, Agent, or Firm* — Crowell & Moring LLP

(57) ABSTRACT

A pressure vessel for storing may have a connection piece for forming a fluid connection between the fuel storage volume V of the pressure vessel and an energy converter of a motor vehicle. At least part of the connection piece may extend out of the pressure vessel. An outer surface of the connection piece may have a sealing face and a curved fastening face. The sealing face may be designed to seal off the fluid connection between the pressure vessel and a fuel-conducting section of the motor vehicle. The fastening face may be provided for fastening the pressure vessel to at least one body attachment element.

17 Claims, 11 Drawing Sheets

(58) Field of Classification Search
CPC ...... F17C 2201/0109; F17C 2201/0138; F17C 2205/0142; F17C 2205/0146; F17C 2205/0192; F17C 2205/0305; F17C 2205/0326; F17C 2205/0332; F17C 2205/0335; F17C 2260/013; F17C 2265/066; Y02E 60/32
USPC ...................................................... 141/81, 18
See application file for complete search history.

(56) References Cited

U.S. PATENT DOCUMENTS

| | | | | |
|---|---|---|---|---|
| 5,676,180 | A * | 10/1997 | Teel | F17C 5/06 137/267 |
| 6,112,760 | A * | 9/2000 | Scott | F17C 13/084 137/255 |
| 6,257,360 | B1 * | 7/2001 | Wozniak | B60K 15/013 180/69.5 |
| 6,786,229 | B1 * | 9/2004 | Friedlmeier | F17C 1/00 137/259 |
| 7,316,242 | B2 * | 1/2008 | Porter | F17C 13/084 137/255 |
| 7,624,753 | B2 * | 12/2009 | Suess | B60K 15/063 137/259 |
| 9,206,946 | B2 * | 12/2015 | Mayr | F17C 13/002 |
| 10,655,646 | B2 * | 5/2020 | Chen | F17C 7/00 |
| 11,933,455 | B2 * | 3/2024 | Icard | F17C 5/00 |
| 12,031,673 | B2 * | 7/2024 | Kataoka | F17C 1/00 |
| 12,129,968 | B2 * | 10/2024 | Kataoka | F17C 13/04 |
| 2003/0146214 | A1 * | 8/2003 | Idoguchi | F17C 13/04 220/23.83 |
| 2004/0159352 | A1 | 8/2004 | Friedlmeier et al. | |
| 2005/0161267 | A1 * | 7/2005 | Elson | B62D 21/16 180/69.5 |
| 2014/0130896 | A1 | 5/2014 | Mayr | |
| 2017/0328518 | A1 * | 11/2017 | Pegel | F17C 1/16 |
| 2018/0328540 | A1 | 11/2018 | Hettenkofer | |
| 2019/0047409 | A1 * | 2/2019 | Kataoka | B60K 15/067 |
| 2019/0170260 | A1 | 6/2019 | Hausmann | |
| 2019/0263450 | A1 | 8/2019 | Inoue et al. | |
| 2023/0408040 | A1 * | 12/2023 | Gutmann | F17C 13/084 |
| 2024/0360962 | A1 * | 10/2024 | Gutmann | F16C 27/063 |

FOREIGN PATENT DOCUMENTS

| | | |
|---|---|---|
| DE | 102 06 502 C1 | 8/2003 |
| DE | 10 2005 003 669 A1 | 8/2005 |
| DE | 602 06 264 T2 | 4/2006 |
| DE | 10 2012 011 612 A1 | 1/2013 |
| DE | 10 2014 016 023 B3 | 3/2016 |
| DE | 10 2015 015 004 A1 | 5/2017 |
| DE | 10 2015 222 252 A1 | 5/2017 |
| DE | 10 2016 008 107 A1 | 1/2018 |
| DE | 10 2019 202 285 A1 | 8/2019 |
| DE | 10 2019 202 895 A1 | 9/2020 |
| EP | 2 650 585 A1 | 10/2013 |
| EP | 3 067 610 B1 | 5/2018 |

OTHER PUBLICATIONS

International Search Report (PCT/ISA/210) issued in PCT Application No. PCT/EP2021/074341 dated Dec. 9, 2021 with English translation (four (4) pages).
German-language Written Opinion (PCT/ISA/237) issued in PCT Application No. PCT/EP2021/074341 dated Dec. 9, 2021 (four (4) pages).
German-language Search Report issued in German Application No. 10 2020 123 037.0 dated Jun. 11, 2021 with partial English translation (11 pages).

* cited by examiner

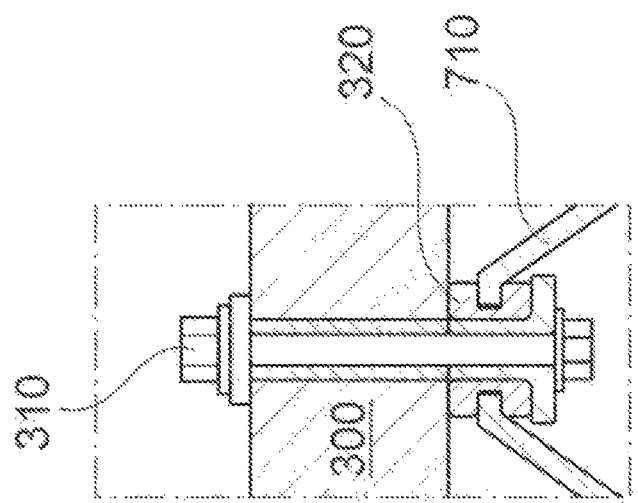
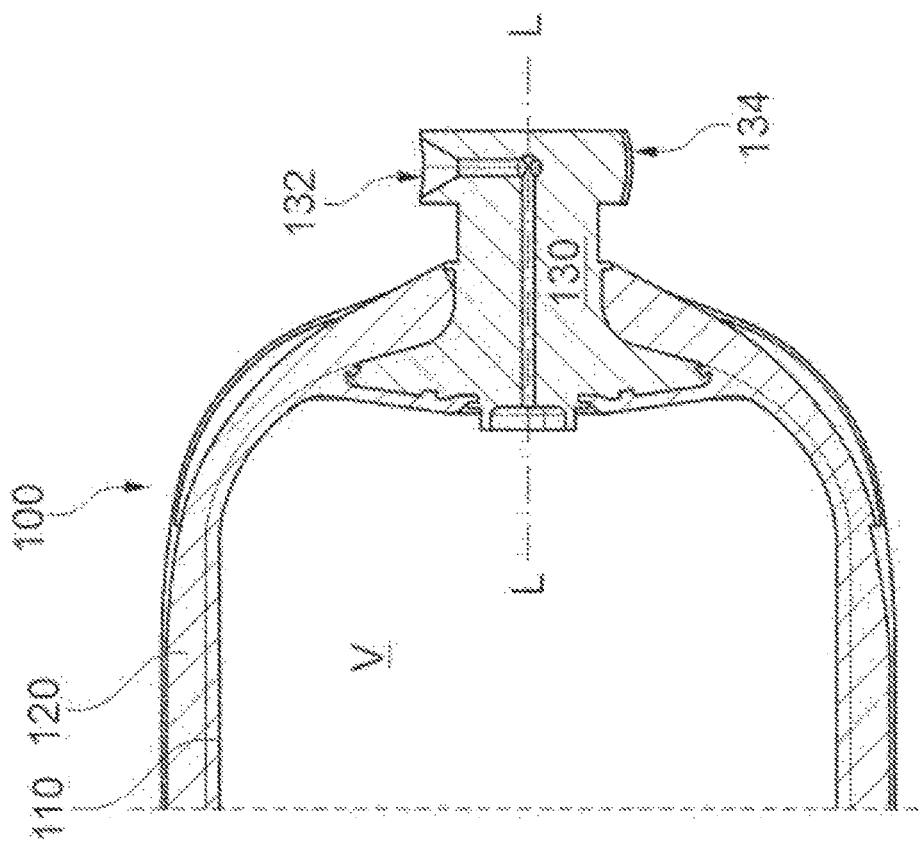
Fig. 8
Fig. 7

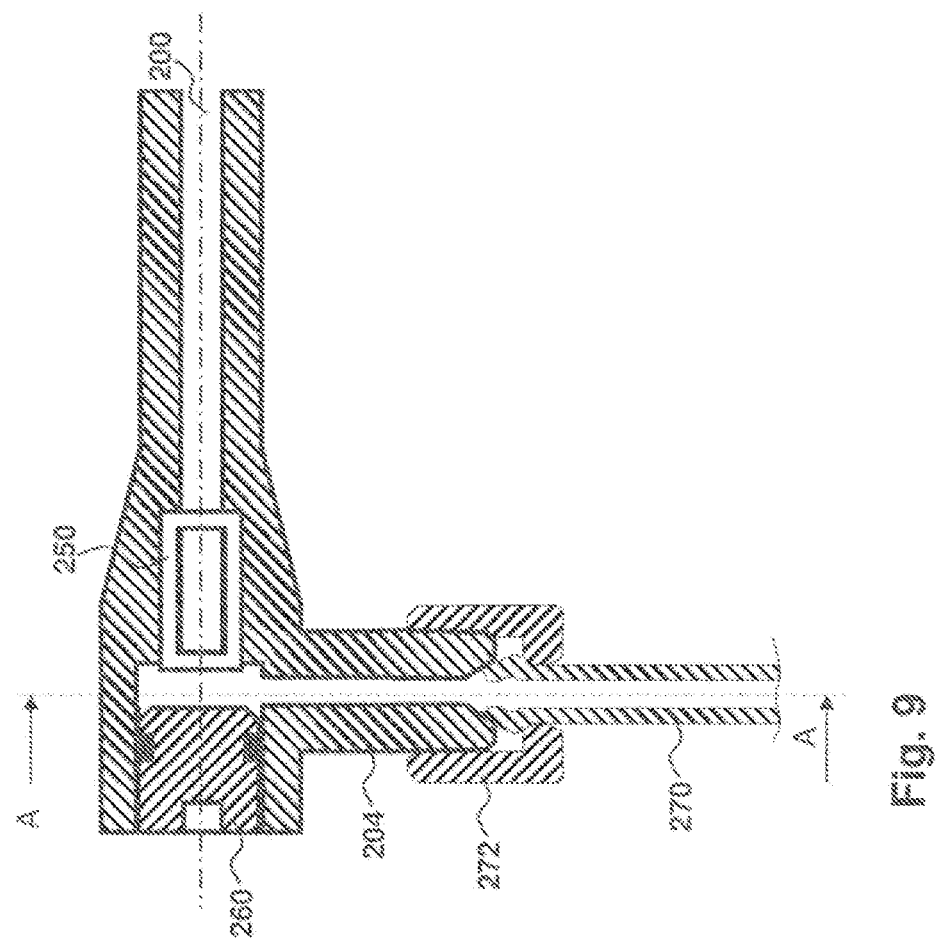

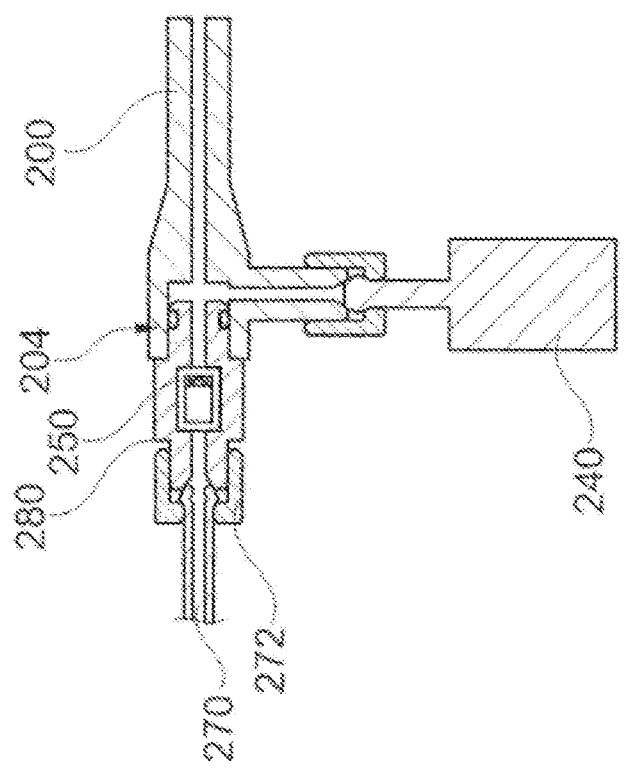
Fig. 11
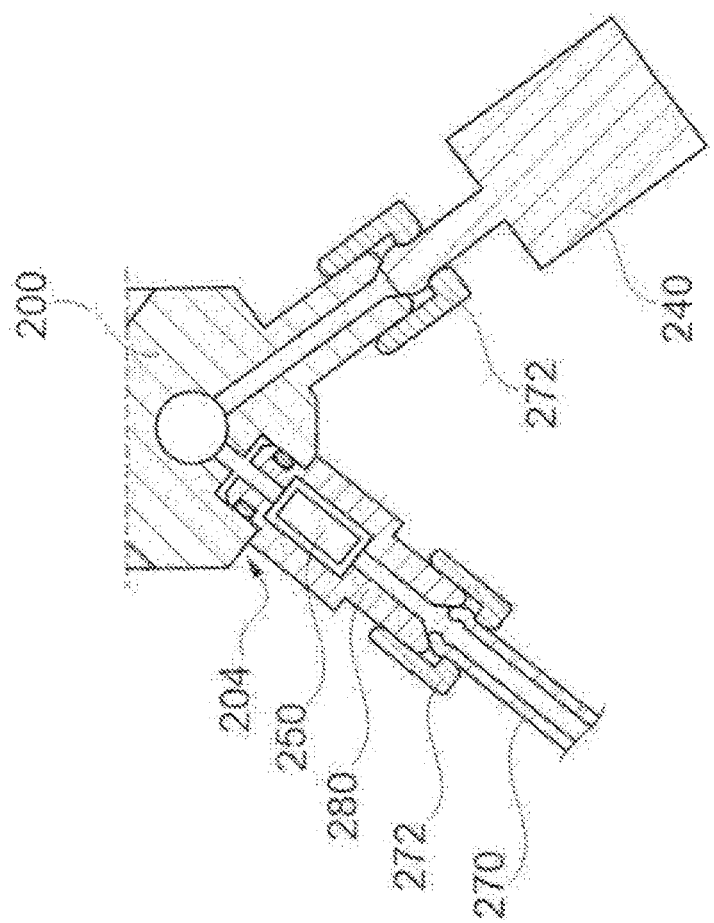
Fig. 10 (A-A)

PRESSURE VESSEL, PRESSURE VESSEL SYSTEM, AND MOTOR VEHICLE HAVING FUEL RAIL

CROSS REFERENCE TO RELATED APPLICATION

This application is a filing under 35 U.S.C. § 371 of International Patent Application PCT/EP2021/074341, filed Sep. 3, 2021, and claiming priority to German Patent Application DE 10 2020 123 037.0, filed Sep. 3, 2020. All applications listed in this paragraph are hereby incorporated by reference in their entireties.

BACKGROUND AND SUMMARY

From the prior art, motor vehicles having pressure vessels are known. Generally, up to three large pressure vessels are provided per motor vehicle. As a result of their dimensions, such pressure vessels are comparatively difficult to integrate in a motor vehicle. Furthermore, there are vehicle concepts in which significantly more pressure vessels are integrated in the motor vehicle, wherein each individual pressure vessel is constructed in a substantially tubular manner. Pressure vessel systems with a large number of storage pipes can be better integrated into the structural space available. The disadvantage is that such pressure vessel systems are comparatively complex and costly since they have to comply with the same requirements with respect to range and component safety as conventional pressure vessel systems.

A preferred objective of the technology disclosed in this instance is to reduce or overcome at least one disadvantage of a previously known solution. A preferred objective of the technology disclosed in this instance is to propose a comparatively simple, cost-effective, safe, lightweight and/or structural-space-optimized pressure vessel system. Other preferred objectives can be derived from the advantageous effects of the technology disclosed in this instance. The objective(s) is/are achieved by the subject-matter of patent claims. Certain dependent claims represent preferred embodiments.

The technology disclosed in this instance relates to a pressure vessel system for a motor vehicle (for example, passenger vehicles, motorcycles, utility vehicles). The pressure vessel system comprises at least one pressure vessel for storing fuel. The pressure vessel system serves to store fuel which is gaseous under ambient conditions. The pressure vessel system may, for example, be used in a motor vehicle which is operated with compressed natural gas (compressed natural gas or CNG) or liquid natural gas (liquid natural gas or LNG) or with hydrogen. The pressure vessel system is connected in fluid terms to at least one energy converter which is configured to convert the chemical energy of the fuel into other energy forms, for example, a fuel cell or an internal combustion engine.

Furthermore, the technology disclosed herein relates to a pressure vessel. The pressure vessel may, for example, be a high pressure gas vessel. High pressure gas vessels are constructed to store fuel at ambient temperatures permanently at a nominal operating pressure (also referred to as nominal working pressure or NWP) of at least 350 bar (gauge) (=excess pressure with respect to atmospheric pressure) or at least 700 bar (gauge). The pressure vessels may have circular or oval cross sections. For example, a plurality of pressure vessels may be provided, the longitudinal axes of which extend in the installation position parallel with each other. The individual pressure vessels may each have a length to diameter ratio having a value between 5 and 200, preferably between 7 and 100, and in a particularly preferred manner between 9 and 50. The length to diameter ratio is the quotient from the overall length of the individual pressure vessels (for example, overall length of a storage pipe without fluid connection elements) in the numerator and the largest outer diameter of the pressure vessel in the denominator. The individual pressure vessels may be arranged directly adjacent to each other, for example, with a spacing from each other of less than 20 cm or less than 15 cm or less than 10 cm or less than 5 cm. The plurality of pressure vessels may each be mechanically coupled to each other at one end or at both ends. Advantageously, there may further be provision for there to be provided at both ends in each case for the plurality of pressure vessels common body connection elements by means of which the pressure vessels can be secured in the motor vehicle. Such a system is particularly suitable for flat installation spaces, in particular in the underfloor region below the vehicle interior.

The pressure vessel comprises a connection piece. The connection piece forms the pressure vessel opening of the pressure vessel. Generally, the connection piece is provided at one end of the pressure vessel. The connection piece is preferably produced from metal and is also often referred to as a "boss". Advantageously, the connection piece is provided coaxially relative to the pressure vessel longitudinal axis. The connection piece serves to form a fluid connection between the fuel storage volume of the pressure vessel and the energy converter of the motor vehicle. A portion of the connection piece is guided out of the pressure vessel. Another portion may be integrated in the vessel wall. However, it is also conceivable for the connection piece to be fitted to the pressure vessel exterior. For example, the connection piece may have a portion which protrudes into the vessel wall and which is surrounded by a fiber-reinforced layer. Such a fiber-reinforced layer may also be referred to as a reinforcement and is generally applied by means of braiding and/or winding. Preferably, the connection piece comprises an end face, which generally extends substantially parallel with a plane which is orientated perpendicularly to the pressure vessel longitudinal axis. The side faces of the connection piece are provided laterally with respect to the end face.

In one embodiment, there may be provided in the fuel storage volume or in the connection piece of the at least one pressure vessel a pipe breakage protection valve which prevents the outflow of fuel from the pressure vessel in the event of a failure. Such a pipe breakage protection valve prevents the uncontrolled release of the fuel in the event of a line breakage in the downstream line system of the fuel supply installation and can automatically be reset when the failure has been resolved.

The portion, which is guided out of the pressure vessel, of the outer surface of the connection piece comprises a sealing face and a curved securing face. The outer surface of the portion of the connection piece which protrudes from the pressure vessel has a sealing face. The sealing face may be in the form of a frustoconical or funnel-like face which tapers into the connection piece. The sealing face is configured in the installation position of the pressure vessel to seal the fluid connection between the pressure vessel and a fuel-carrying portion of the motor vehicle. To this end, an outer surface of the fuel-carrying portion may contact the sealing face of the connection piece directly or with a sealing element being interposed. Preferably, the outer face of the fuel-carrying portion is a curved and in a particularly preferred manner a spherical-segment-like outer surface which at least partially contacts the sealing face. If the spherical-segment-like outer surface of the fuel-carrying portion and the frustoconical sealing face meet each other, consequently, a good sealing seat can be achieved. Furthermore, the pressure vessel can consequently also be orientated using simple means.

The outer surface of the portion of the connection piece which protrudes from the pressure vessel further has a curved securing face. The securing face may be formed by a surface portion of a spherical segment or a cylinder. The securing face is provided for direct or immediate securing of the pressure vessel to at least one body connection element. The at least one body connection element serves to directly or indirectly secure the pressure vessel to the body of the motor vehicle and may have any suitable form. The connection piece or the body connection element is/are constructed to transmit the forces and torques which result from the pressure vessel during operation of the motor vehicle at the respective end at which the connection piece is provided to the body of the motor vehicle. The body connection element may have a curved and preferably spherical-segment-like inner surface, of which the curvature to form a contact face substantially corresponds to the curvature of the outer surface of the securing face. Consequently, the largest possible contact face for securely transmitting the mechanical load can be produced. The securing face and the sealing face are advantageously provided laterally on the portion of the connection piece which is guided out of from the pressure vessel. The connection piece may advantageously comprise an end face which is arranged in a plane which extends substantially perpendicularly to the pressure vessel longitudinal axis. The portion, which is guided out of the pressure vessel, of the connection piece may further comprise circumferential surfaces on which the (lateral) outer faces are provided, wherein the securing face and the sealing face may be provided on these circumferential faces. In one embodiment, the circumferential faces may advantageously extend at right-angles with respect to the end face. The securing face and the sealing face may be arranged opposite each other in such a manner that in the installation position the securing face and the sealing face can be clamped with respect to each other by the same at least one clamping means (for example, screws). The fuel-carrying portion and the body connection element in order to form a bearing location may preferably clamp the portion of the connection piece which is guided out. The connection piece and in particular the securing face thus serve to support the pressure vessel in the motor vehicle. Such a bearing via the end of the pressure vessel is also referred to as a "neck mount".

The fuel system or the pressure vessel may be configured in such a manner that the fuel at the end of the pressure vessel can flow in and flow away via a fluid channel which extends laterally and in particular perpendicularly to the pressure vessel longitudinal axis.

In the installation position of the pressure vessel, the sealing face may abut the fuel-carrying portion in sealing face contact locations. In the installation position of the pressure vessel, the securing face may contact the body connection element in securing surface contact locations. The angular deviation is the deviation of the actual installation position of the pressure vessel from a desired installation position with respect to the pressure vessel longitudinal axis. Generally, there is provision for the opening of the pressure vessel and the sealing face surrounding it to always be arranged at the same position during assembly. As a result of inevitable tolerances, there are deviations from this ideal position. With regard to the rotation about the pressure vessel longitudinal axis, this deviation may be described by the angular deviation. In the pressure vessel disclosed herein or the pressure vessel system disclosed herein, the sealing face and the securing face can be arranged and constructed in such a manner that with different angular deviations A (i) the sealing face contact locations and the securing face contact locations are formed in each case at different locations and (ii) the entirety of the sealing face contact locations resulting from different angular deviations A and the entirety of securing face contact locations resulting from different angular deviations A each have curved faces having at least one common rotation location. Advantageously, consequently, with different angular deviations A, the fluid connection between the portion and the pressure vessel can also be produced without any leakage. At the same time, with different angular deviations A comparatively good interference fits for supporting the pressure tank via the sealing face and the curved face can also further be produced.

The fuel-carrying portion serves to fill the pressure vessel with fuel and/or to remove fuel from the pressure vessels. Preferably, the pressure in the fuel-carrying portion substantially corresponds to the inner pressure of the pressure vessels. The individual pressure vessels are generally connected in parallel. The plurality of pressure vessels are connected with respect to each other or together in fluid terms in an interruption-free manner. The term "interruption-free" is intended to be understood to mean in this context that there is provided between the individual pressure vessels no valve which would interrupt this fluid connection during error-free operation. Consequently, the fuel pressure in the different pressure vessels generally has substantially the same value.

If the pressure vessel system comprises a plurality of pressure vessels, the at least one fuel-carrying portion may preferably be in the form of a fuel rail. The fuel rail may also be referred to as a high-pressure fuel rail. It is generally provided upstream of the high-pressure pressure reducer. In principle, such a fuel rail may be configured in a similar manner to a high-pressure injection rail of an internal combustion engine. Advantageously, the fuel rail comprises a plurality of rail connections for directly connecting the pressure vessels. Advantageously, the individual rail connections are provided directly on the rail housing and/or they all have the same spacing with respect to each other. The fuel rail may be constructed in a substantially bending-resistant manner. Bending-resistant is intended to be understood to mean in this context that the fuel rail is resistant to bending or that during correct use of the fuel rail only a bending which is imperceptible and insignificant for the function is produced. The at least one fuel rail and the at least one body connection element can each clamp a plurality of pressure vessels. Advantageously, consequently, a particularly simple, space-saving and cost-effective pressure vessel system which is light, reliable and rapid to assemble can be achieved.

According to the technology disclosed in this instance, at least one thermally activatable pressure relief device can be connected directly without additional line portions to the at least one fuel rail disclosed in this instance. Alternatively or additionally, a thermally activatable pressure relief device may be provided on the at least one pressure vessel and preferably on each of the pressure vessels, preferably at the distal end(s) with respect to the fuel-carrying portion or at the proximal end(s) or at both ends. The thermally activatable pressure relief device, also referred to as a Thermal Pressure Relief Device (=TPRD) or thermal fuse is generally provided adjacent to the pressure vessel. Under the action of heat (for example, with flames), as a result of the TPRD the fuel stored in the pressure vessel is discharged into the environment. The pressure relief device discharges the fuel as soon as the activation temperature of the TPRD is exceeded (=is thermally activated). Activation lines may further be provided. Such a system for thermal pressure relief is, for example, set out in the German Patent Application with the publication number DE 10 2015222252 A1.

At least one valve unit may be connected to the fuel rail directly and without additional line portions, wherein the valve unit comprises at least one valve which is closed in a powerless state. In a particularly preferred manner, the plurality of pressure vessels during correct operation of the motor vehicle are connected to the valve in fluid terms in an interruption-free manner. The valve is the valve of which the input pressure (substantially) corresponds to the pressure of the plurality of pressure vessels. The valve is in particular a valve which can be controlled or regulated. In the Directive (EU) No. 406/2010 of the Commission of 26 Apr. 2010 for carrying out the Directive (EG) No. 79/2009 of the European Parliament and the Council regarding the type approval of hydrogen-operated motor vehicles, such a tank shut-off valve is also referred to as a first valve. The valve serves inter alia during normal operation to interrupt the fluid connection between the individual pressure vessels and the downstream components of the fuel supply installation, for example, if the motor vehicle assumes a parked state, and/or if a malfunction was detected and the fluid connection should be interrupted for reasons of safety. Between the fuel storage volume of the pressure vessels and the rail connections there are generally provided no valves which are closed in a powerless state.

The technology disclosed in this instance further relates to a motor vehicle having the pressure vessel system which is disclosed herein or the pressure vessel which is disclosed herein. An underfloor region of the motor vehicle may be subdivided by means of at least one carrier into different underfloor installation regions. Such carriers may be provided in order to transmit the loads which are introduced into the motor vehicle in the event of a side impact to the opposing sill. On or in a plurality of or all of the underfloor installation regions, a fuel rail to which the pressure vessels which are arranged in the respective underfloor structural region are connected may be provided. In one embodiment, there may be provision, depending on customers' wishes, to provide the individual underfloor installation regions with high-voltage batteries or with pressure vessel systems.

In other words, the technology disclosed herein relates to the provision of one rail per tank module having at least three pressure vessels or tanks. The rail may be produced and finished with a forging method. The connection of the pressure vessel bosses to the rail is carried out via a ball/cone connection. The ball may be provided in the rail and the cone may be provided in the boss. The rail and the boss may be clamped by means of screws so that the pressing force which is required for sealing the connection is also produced thereby. Via three spherical faces (in the rail, in the boss and in the retention member) with the same rotation location (or center) in an advantageous embodiment a tolerance compensation can be enabled. The retention member may be secured to the base structure by means of rubber elements. Consequently, at the connection side of the tanks a fixed bearing can be produced. At the other side, a floating bearing can be provided. The tank system in the vehicle may comprise a different number of tanks or modules. For each of these, by an advantageous combination of the variants a cost-effective fixed bearing with connection and valve elements can be assembled.

BRIEF DESCRIPTION OF THE DRAWINGS

The technology disclosed herein will now be explained with reference to the Figures. In the drawings:

FIG. 7 shows a schematic cross sectional view of a pressure vessel 100 together with the connection piece 130;

FIG. 8 shows a schematic cross sectional view of a securing means 310;

FIG. 9 shows a schematic detailed view of a fuel rail;

FIG. 10 shows a schematic sectioned illustration along the line A-A of FIG. 9;

FIG. 11 shows a schematic detailed view of another fuel rail;

DETAILED DESCRIPTION OF THE DRAWINGS

Figure 1:
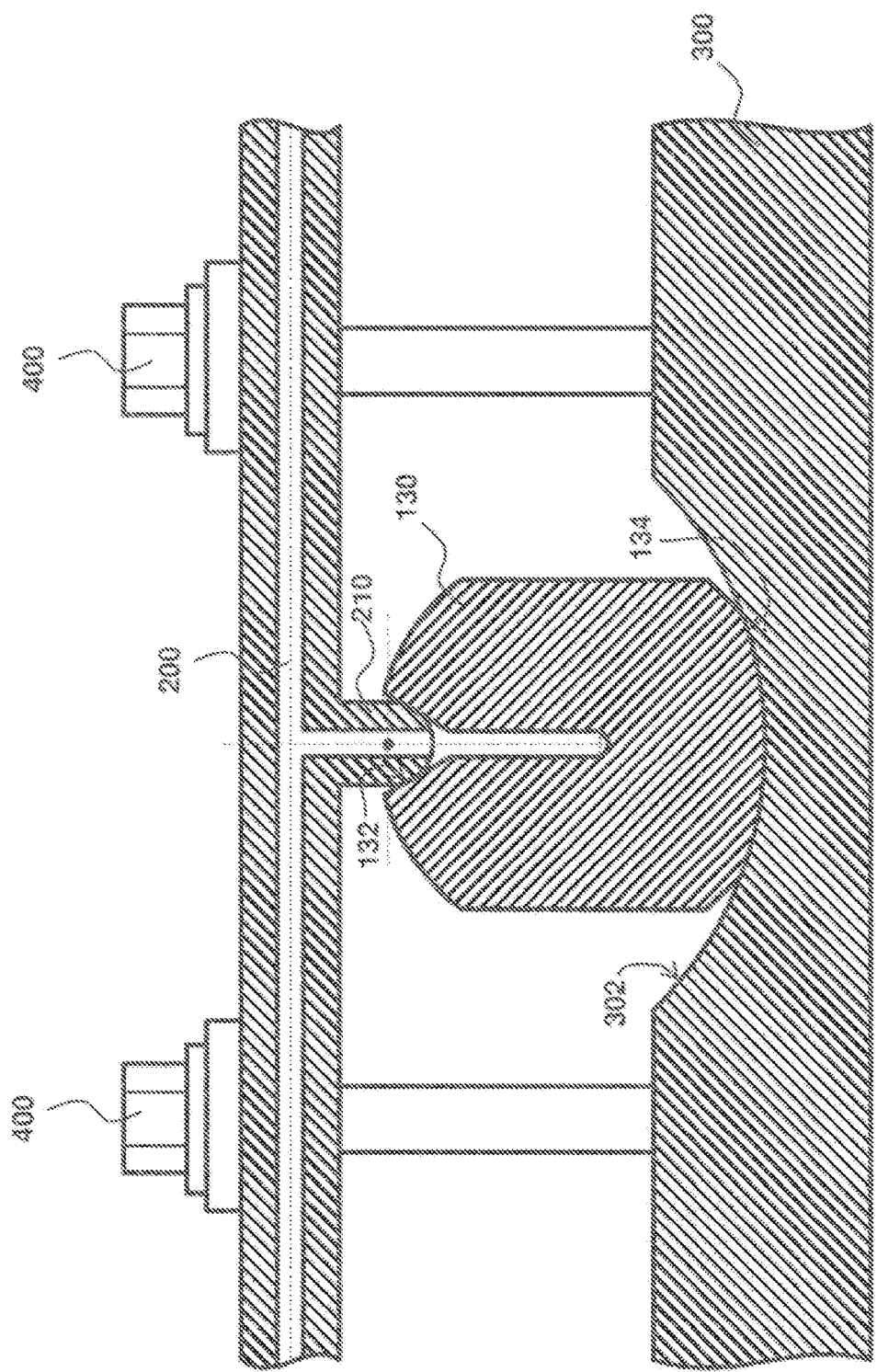
FIG. 1 shows a cross sectional view of a first embodiment of the technology disclosed in this instance.

FIG. 1 shows a schematic cross sectional view of a first embodiment of the technology disclosed in this instance. Only one connection 130 of a pressure vessel 100 is shown in this instance. The pressure vessel 100 itself has been omitted for the sake of simplicity. It is also conceivable for a plurality of pressure vessels 100 to form the pressure vessel system. The connection piece 130 comprises in this instance a fuel channel which extends from the center of the connection piece 130 toward the lateral edge of the connection piece 130 and opens in a frustoconical or funnel-like region. The sealing faces 132 of the connection piece 130 are provided in this region. The rail connection 210 is introduced into this funnel-like region. The spherical-segment-like outer surface of the rail connection 210 forms a sealing seat together with the sealing face 132. At the same time, these components serve to orientate the connection piece 130 during assembly.

The rail connection 210 produces a fluid connection to downstream components, such as, for example, a refueling coupling or an energy converter via the fuel-carrying portion 200. The fuel-carrying portion 200 is in the form in this instance of a bending-resistant fuel rail. The fuel rail may, for example, have a rectangular cross sectional contour. A substantially linearly extending fuel collection channel is provided inside. The fuel rail is constructed to withstand substantially the same pressures as the pressure vessel(s) which is/are connected to the fuel rail. Opposite the sealing face 132, the securing face 134 is provided by the connection piece 130. The securing face 134 has in the contact faces thereof substantially the same curvature as the inner surface 302 of the body connection element 300. The body connection element 300 is in this instance an elongate support element which is provided substantially parallel with the fuel rail. The body connection element 300 may have any suitable cross sectional profile. In the body connection element 300, a recessed region which forms the inner surface 302 is provided. In another embodiment, the inner surface may also protrude partially or completely from the body connection element 300. In a preferred embodiment, the fuel rail and the body connection element 300 have substantially the same length. In one embodiment, the fuel rail and/or the body connection element 300 have a length of at least 30 cm or at least 60 cm or at least 90 cm or at least 120 cm.

The clamping means 400 are in this instance expansion screws which in this instance clamp the fuel rail and the body connection element 300 with respect to each other.

Figure 2:
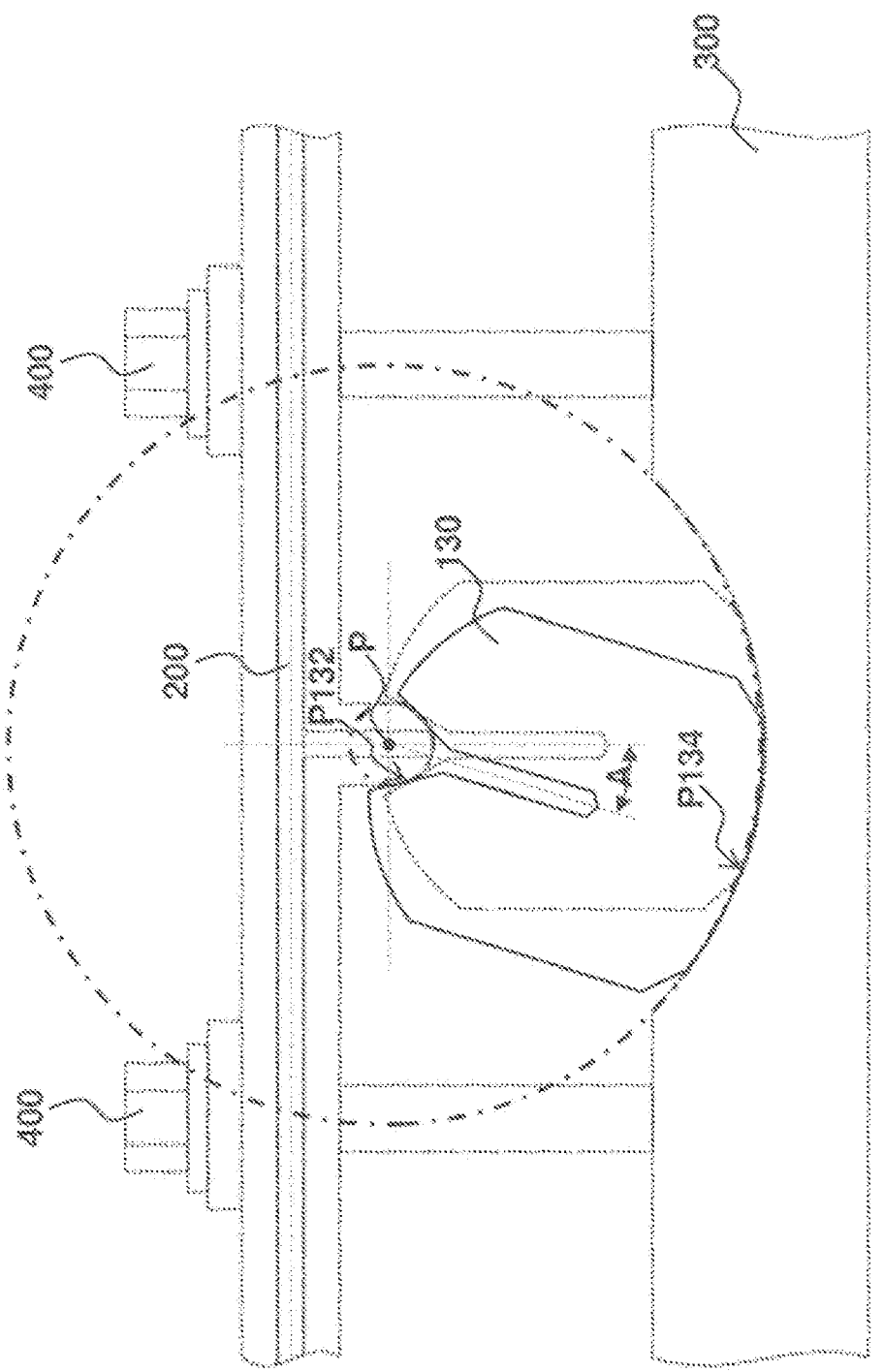
FIG. 2 shows a schematic cross sectional view of the embodiment according to FIG. 1 with an angular deviation A.

FIG. 2 shows a schematic cross sectional view of the embodiment according to FIG. 1 with an angular deviation A. Structural components and functions which are identical in both Figures are partially not shown or only illustrated with dots. Only the differences or additions will be explained below and otherwise reference may be made to the explanations relating to FIG. 1. The connection piece 130 is in this instance shown in an actual installation position which differs from the desired installation position illustrated with dots. The extent of the deviation with regard to the pressure vessel longitudinal axis is shown in this instance by the angular deviation A. In spite of the comparatively large angular deviation A, the technology disclosed in this instance enables a safe securing or clamping of the connection piece 130 by the body connection element 300 and the fuel rail. The technology disclosed in this instance also advantageously ensures that the sealing face 132 abuts in a sealing manner against the outer surface of the rail connection 210. This is enabled by the specific configuration and arrangement of the sealing face 132 or securing face 134. Illustrated with dot-dash lines in FIG. 2 are the circular paths on which the possible sealing face contact locations P132 and the possible securing surface contact locations P134 are located. These circular paths indicate which contact locations could be produced for different angular deviations A, wherein, for clarification, locations which, as a result of inadmissibly high angular deviations A cannot be produced any more are also depicted. It can be seen that the sealing face contact locations P132 and the securing face contact locations P134 are located on circular or spherical portions which have the common rotation location P. Consequently, a particularly good tolerance compensation between the fuel rail, the body connection element 300 and the connection piece 130 can be achieved.

Figure 3:
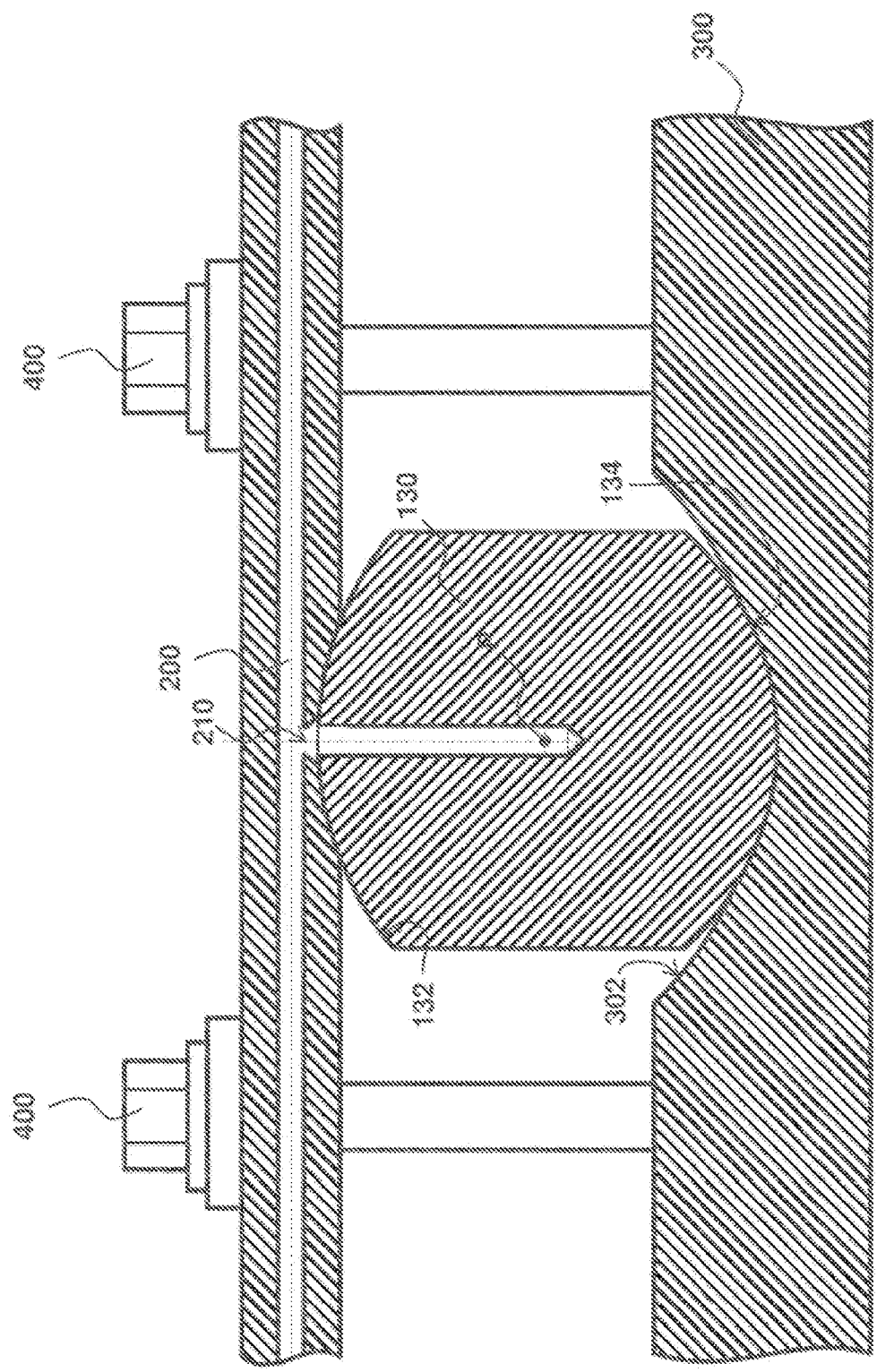
FIG. 3 shows a cross sectional view of a second embodiment of the technology disclosed in this instance.

FIG. 3 shows a schematic cross sectional view of an alternative embodiment of the connection piece 130 and the fuel rail. Only the differences with respect to the explanation set out above will be explained below.

The rail connection 210 is in this instance not in the form of a projection, but instead a recessed or set back region which the sealing face 132 abuts. The sealing face 132 is no longer in the form of a conical face, but instead also in the form of a curved outer face. The curvature of the rail connection 210 in the contact region substantially corresponds to the curvature of the sealing face 132. In a preferred embodiment, both faces are constructed in a spherical-segment-like manner. The common rotation location P of the sealing face 132 and the securing face 134 is in this instance provided in or directly adjacent to the pressure vessel longitudinal axis L-L. The rotation location P is advantageously also the rotation location of the inner surface of the body connection element 300 and the rail connection 210.

Figure 4:
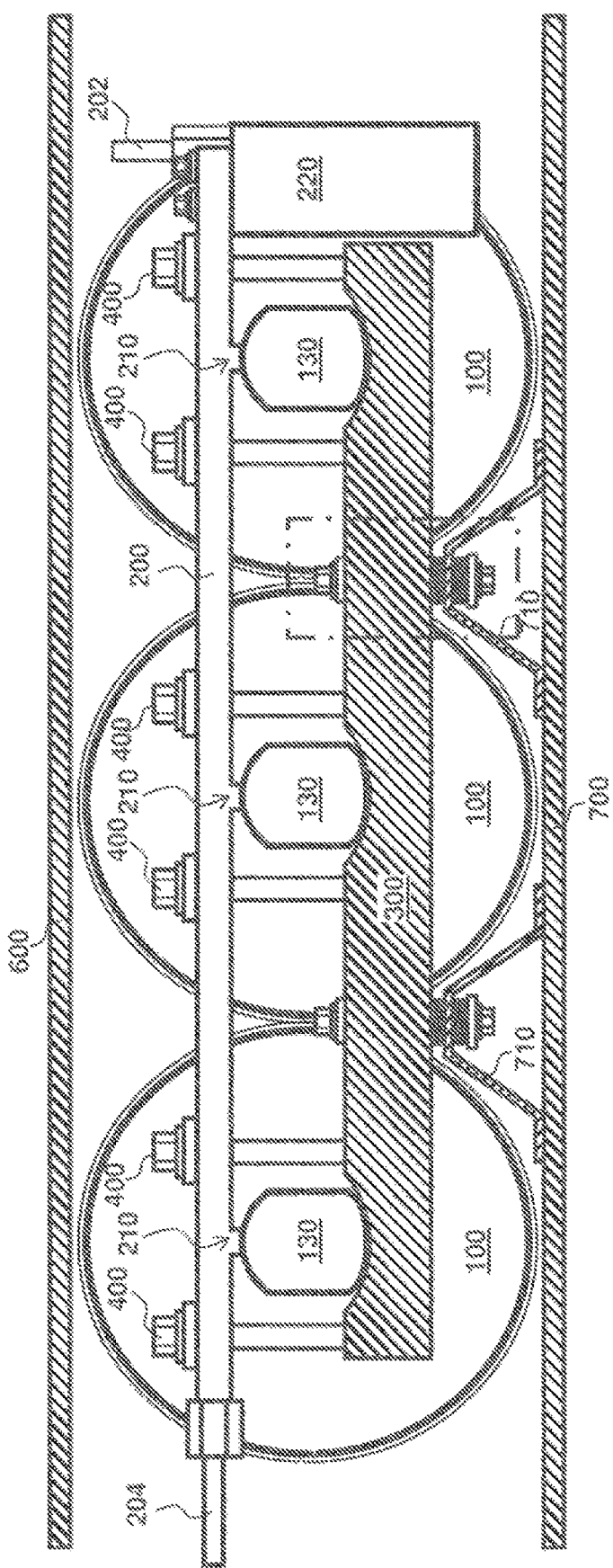
FIG. 4 shows a schematic cross sectional view of an embodiment with a plurality of pressure vessels.

FIG. 4 shows a schematic cross sectional view of an embodiment according to FIG. 1 having a plurality of pressure vessels 100. Only the most significant differences with regard to the previous embodiments will be explained in greater detail below and otherwise reference may be made to the explanations relating to the other Figures. The pressure vessels 100 are in this instance provided coaxially in a plane in the underfloor region of the motor vehicle. In the installation position, a metal base sheet 600 is located above the pressure vessels. The base plate 700 is provided below the pressure vessels 100. In one embodiment, the metal base sheet 600 and the base plate may be a component of a common housing of the pressure vessel system. In another embodiment, such a separate housing is not provided.

The fuel rail comprises in this instance three rail connections 210, via which three pressure vessels 100 are connected to each other in fluid terms in an interruption-free manner. Any other components, such as, for example, a pipe breakage protection member or a thermally activatable pressure relief valve, are not shown. The sealing faces 132 of the connection piece 130 are orientated with the rail connections 210 and at the same time pressed downward. The body connection element 300, in particular the inner surfaces 302 thereof, apply the counter-forces. The connection pieces 130 are thereby held in their position. Securing elements 710 protrude from the base plate 700. These securing elements 710 serve at the same time to stabilize the base plate 700. Laterally on the fuel rail 200 the valve unit 220 is directly secured to the fuel rail. In the valve unit 220 there is provided a valve which is closed in a powerless state and which prevents the fuel supply to the downstream components of the fuel supply system (for example, the components of an anode subsystem of a fuel cell system). Generally, there is provided adjacent to the valve unit 220 or in the valve unit 220 a pressure reducer which reduces the pressure to a medium pressure range (generally, to a value between 5 bar and 50 bar). In a state guided out of the valve unit 220 in this instance there is provided a removal line connection 202 which, for example, can be connected to the removal line (not shown). At the other end of the fuel rail there is provided in this instance a refueling line connection 204 which can be connected to a refueling line. In place of lines which lead to other components, other fuel rails or other elements could also be coupled directly at that location.

Figure 5:
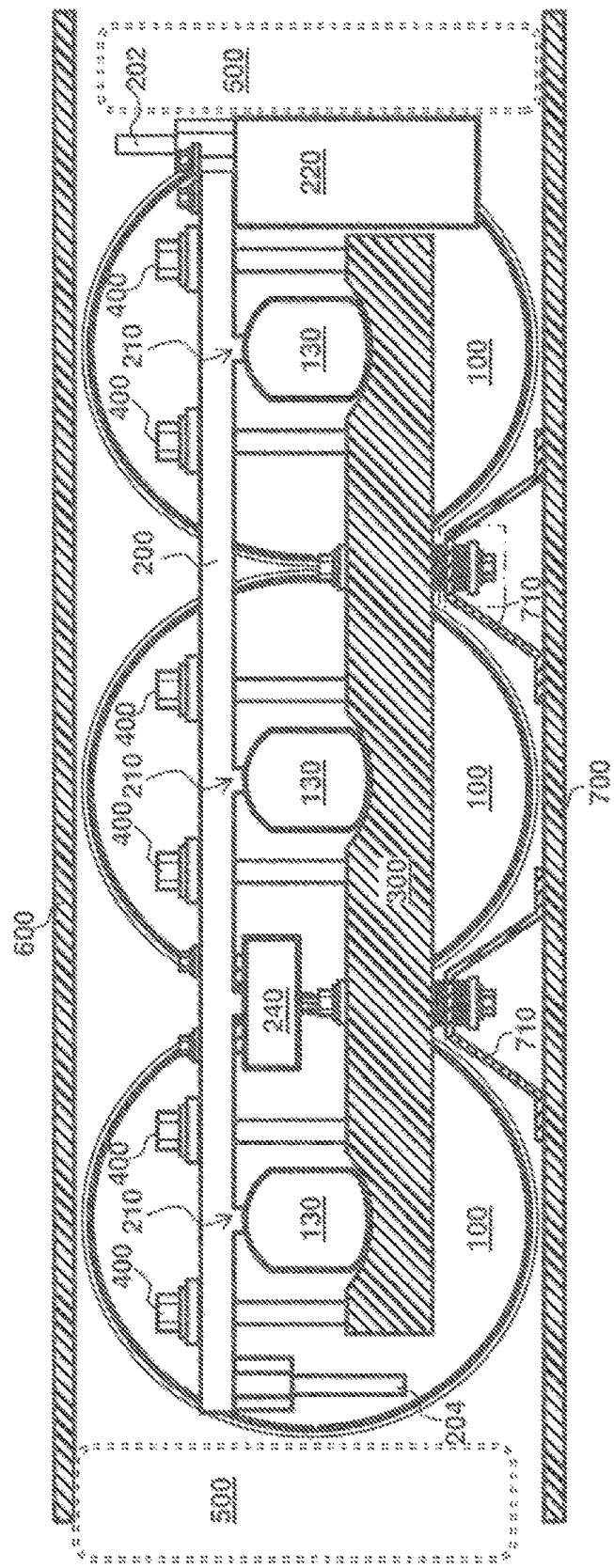
FIG. 5 shows a schematic cross sectional view of another embodiment with a plurality of pressure vessels.

FIG. 5 shows a schematic cross sectional view of another embodiment. Only the most significant differences with regard to the previous embodiments are explained in greater detail below and otherwise reference may be made to the other Figures. The fuel rail comprises, in addition to the rail connections 210 for the pressure vessels 100 and the connections for the valve unit 220 or the line connections 202, 204, another pressure relief connection 242 for connecting the thermally activatable pressure relief device 240. If there is a thermal event, the pressure relief device 240 is activated and there is a pressure relief of all three pressure vessels 100. Preferably, there may be provision for there to be provided at the ends of the fuel rail, in particular at or in the line connections 202, 204 and/or in the valve unit 220, a pipe breakage protection member which prevents the fluid connection to adjacent components of the fuel supply system of the motor vehicle (i) should the pressure vessel 100 and/or the fuel rail become damaged and/or (ii) should the pressure relief device 240 be activated. In a preferred embodiment, thermally activatable pressure relief devices 240 are also provided at the ends remote from the connection pieces 130.

The carriers 500 which subdivide the individual underfloor installation spaces are shown schematically here. The left carrier extends in this instance from the metal base sheet 600 of the motor vehicle in a downward direction. In order to overcome this, the refueling line connection 204 is provided in this instance in a state orientated in a downward direction. Consequently, a refueling line can in this instance be laid below the carrier 500. At the right edge, however, it is assumed that the carrier 500 extends away from the base plate 700 in an upward direction. At the right edge, the fuel line can be laid over the carrier 500. The specific arrangement of the lines can be adapted in accordance with the installation situation.

Figure 6:
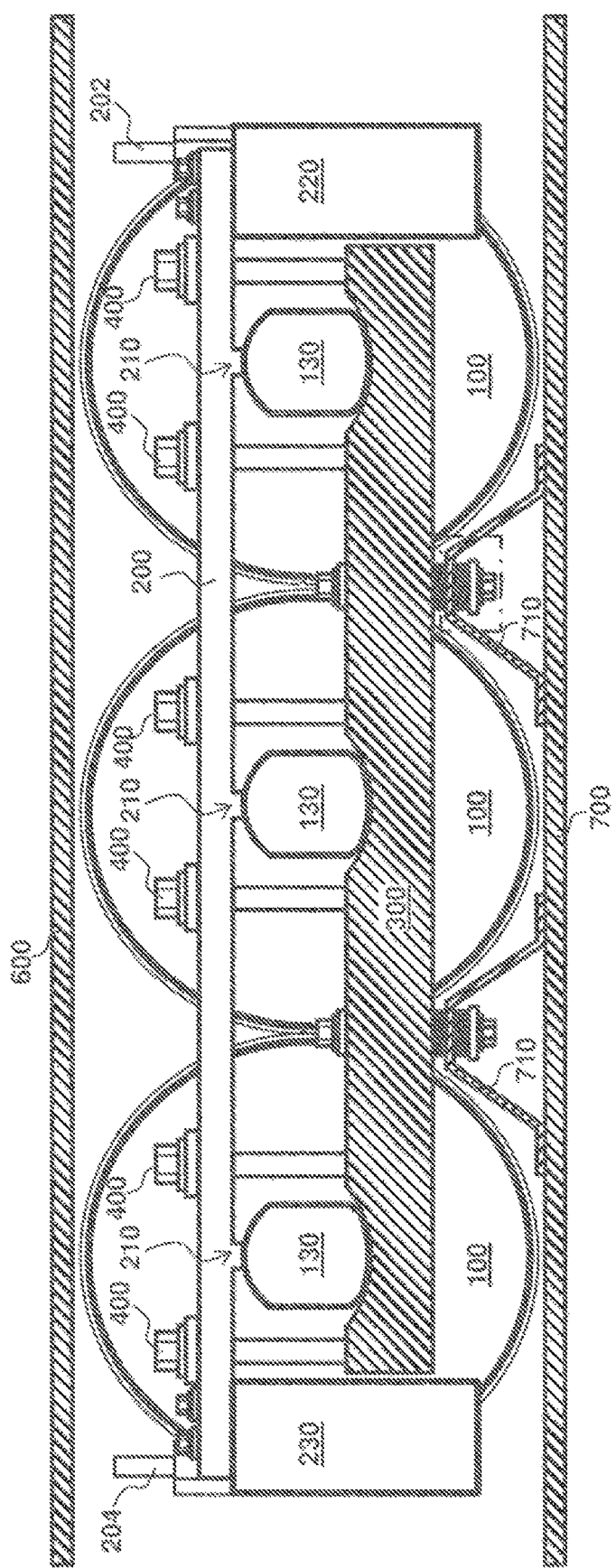
FIG. 6 shows a schematic cross sectional view of another embodiment with a plurality of pressure vessels.

FIG. 6 shows a schematic cross sectional view of another embodiment. Only the most significant differences with regard to the previous embodiments will be explained in greater detail below and otherwise reference may be made to the other Figures. The fuel rail additionally comprises another valve unit 230 which may be provided at the other end of the fuel rail. In this valve unit, for example, there may be provided a non-return valve which prevents the return flow of fuel into the upstream region of the refueling path. The thermally activatable pressure relief device 240 (not shown) could also be provided on this unit.

FIG. 7 shows a schematic cross sectional view of a pressure vessel 100 together with the connection piece 130. The pressure vessel 100 comprises a liner 110 which forms the fuel storage volume V. The liner 110 may, for example, be a plastics material liner 110 which has been braided or wound with carbon fibers in order to form the fiber-reinforced layer 120. The connection piece 130 is provided in this instance at the right end of the pressure vessel 100. The connection piece 130 is constructed in this instance in one piece and protrudes from the end of the pressure vessel 100. It is thus produced from a single component and is not able to be disassembled in a destruction-free manner. There are provided on the portion of the connection piece 130 which is guided out a spherical securing face 134 and opposite it a frustoconical sealing face 132. The fuel channel which is already formed in the connection piece 130 before the pressure vessel 100 is produced extends from the inner side of the pressure vessel 100 initially axially and in the portion which is guided out then in a radial direction and opens in the laterally provided sealing face 132. The portion of the connection piece 130 which is provided in the pressure vessel wall also extends in a radial direction. The portion which extends in a radial direction is at least partially surrounded by the fiber-reinforced layer 120. Consequently, a particularly good liner/boss connection can be achieved. Furthermore, the connection between the connection piece 130 and the fuel rail can be produced in a simple manner.

FIG. 8 shows a schematic and enlarged cross sectional view of a damped securing means 310 for securing the body connection element 300 to the securing element 710 of the base plate 700, as indicated, for example, in FIGS. 4 to 6. The damped securing means 310 comprises a rubber bearing 320 which at least damps any impacts which act on the securing element 710 during operation of the motor vehicle.

FIG. 9 shows a schematic and enlarged cross sectional view of a fuel rail as may be provided in one of the embodiments disclosed in this instance. The end of the fuel rail has in this instance in comparison with the remaining regions an enlarged cross section so that a component of the fuel supply system can be received in this end portion of the fuel rail. In the example shown, a pipe breakage protection member 250 is received. Alternatively or additionally, a non-return valve, the pressure relief device 240 or a fuel filter could be provided in this end portion. A plug 260 is provided coaxially relative to the fuel channel of the fuel rail. The plug 260 simplifies the assembly and disassembly of the components which are received. The refueling line connection 204 is in this instance integrated in one piece. A fuel line 270 can be connected to the refueling line connection 204 with a union nut 272. The line connection could also be constructed differently. FIG. 10 shows a schematic sectioned illustration along the line A-A of FIG. 9 of an alternative embodiment. In the embodiment, two connections are provided at the end of the fuel rail. A first connection is the refueling line connection 204 which in this instance is connected with the adapter 280 to a fuel line 270 with a union nut 272. In the adapter 280, a component of the fuel supply system, preferably a pipe breakage protection member 250 and/or a fuel filter, may be provided. In fluid terms parallel therewith a thermal pressure relief device 240 may be provided at this end of the fuel rail.

FIG. 11 shows a schematic and enlarged cross sectional view of a fuel line, as may be provided in one of the embodiments disclosed herein. In contrast to the embodiment according to FIG. 10, the refueling line connection does not extend at a right-angle in this instance, but instead coaxially relative to the fuel channel of the fuel rail.

Figure 12:
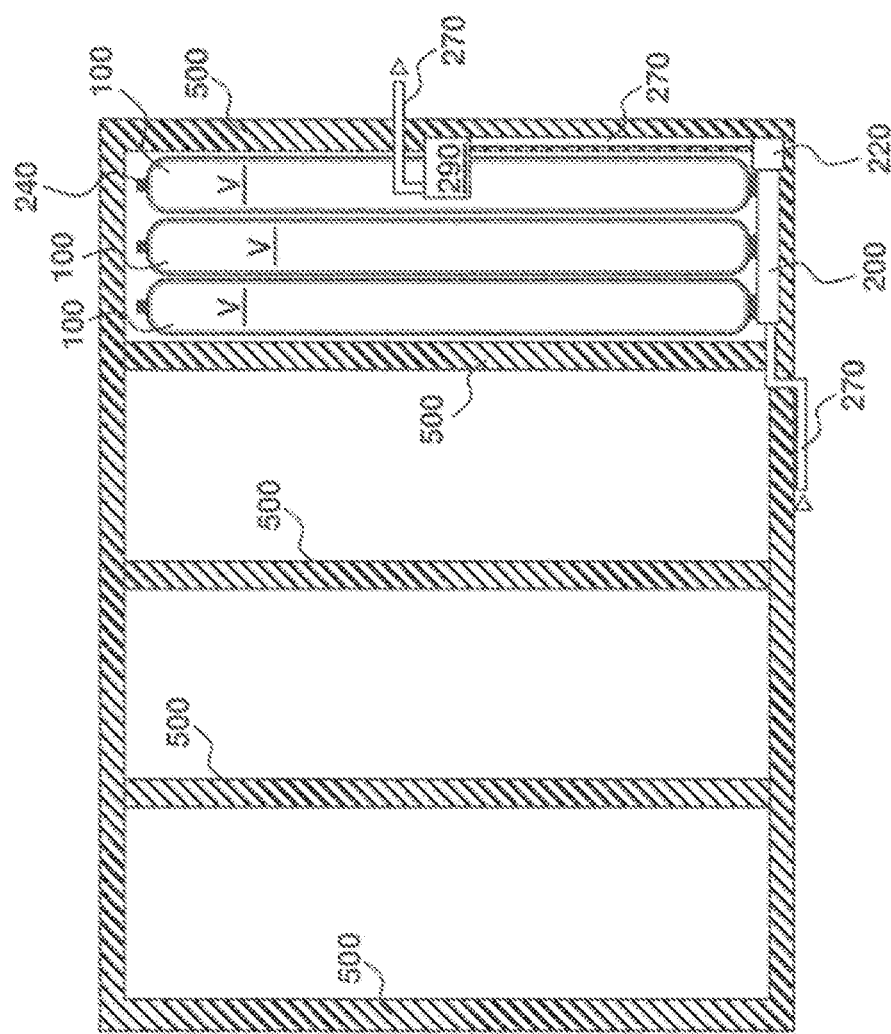
FIG. 12 shows a schematic view of an underfloor region of a motor vehicle according to another embodiment.

FIG. 12 shows a plan view of an underfloor region of a motor vehicle. The carriers 500 subdivide the underfloor region into different underfloor installation regions. The underfloor installation regions are in this instance substantially of the same size. The individual carriers 500 extend in this instance in the transverse vehicle direction from one side sill to the other side sill and contribute significantly to the rigidity of the body structure. In the right underfloor installation region, a pressure vessel system is provided in this instance. The pressure vessel system comprises three pressure vessels 100 which are provided between two carriers 500. The pressure vessels 100 are arranged parallel with each other and parallel with the carriers 500. One end of the pressure vessels 100 is connected to the fuel rail with a connection piece 130 in each case. At the opposite end of the pressure vessels 100, thermally activatable pressure relief devices 240 are provided in each case. The fuel rail forms the fuel-carrying portion 200. There is connected to one end of the fuel rail a fuel line 270 which acts as a refueling line and which is connected to the tank coupling (not shown) of the motor vehicle. At the other end of the fuel rail, the valve unit 220 is provided with the valve which is closed in the powerless state. The valve which is closed in the powerless state is regulated or controlled by a control device of the motor vehicle. As a result of the activation of the valve, the removal of fuel from the pressure vessels is brought about. The valve unit 220 is connected in fluid terms to a pressure reducer 290 via a fuel line 270. Downstream of the pressure reducer 290 there is provided another fuel line 270 which leads to the energy converter (not shown) of the motor vehicle. Depending on the configuration of the motor vehicle, there may be provided in the other underfloor installation regions other pressure vessels and other fuel rails which are connected in fluid terms in series or parallel to the pressure vessels shown. It is also conceivable for high-voltage storage batteries to be provided in one or more underfloor installation regions. It is also conceivable for the same vehicle architecture to be used for a purely electrical-battery-driven motor without any pressure vessel system.

Figure 13:
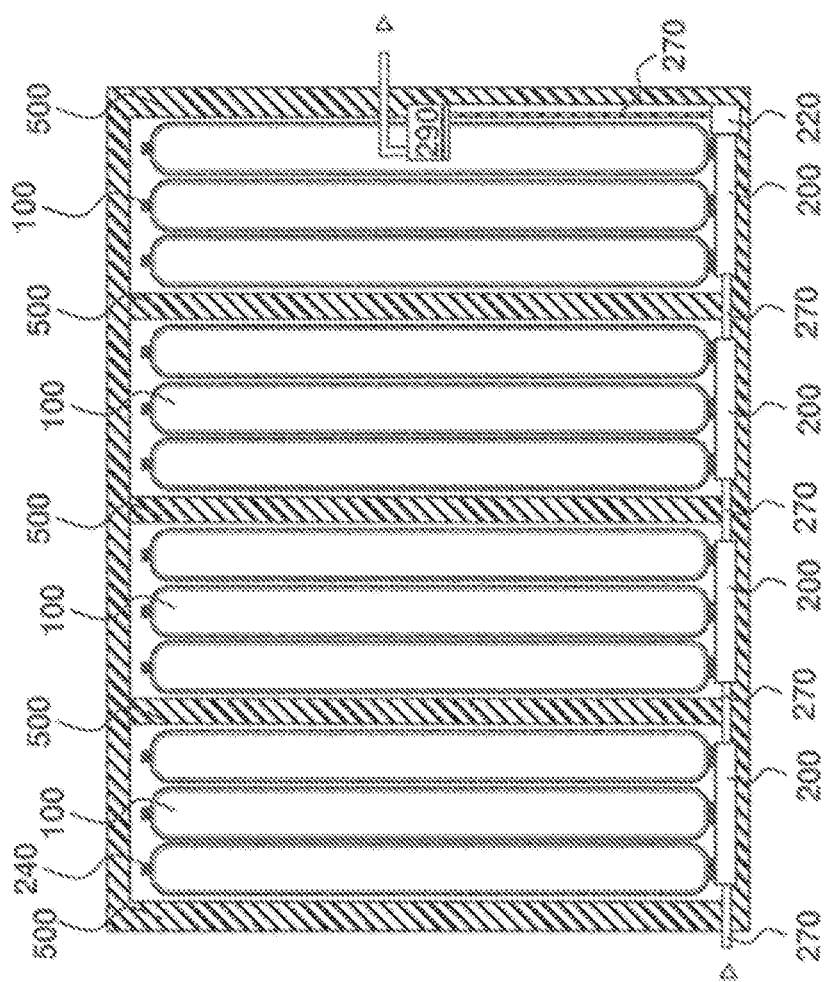
FIG. 13 shows a schematic view of an underfloor region of a motor vehicle according to another embodiment.

FIG. 13 shows another plan view of an underfloor region of a motor vehicle. In this embodiment, four fuel rails are provided, wherein a fuel rail is arranged in each case with three pressure vessels 100 in an underfloor region. The fuel rails are in this instance connected in series and connected to each other in each case with fuel lines 270. The fuel lines 270 are guided around the carriers 500. Between the pressure reducer 290 and the fuel rails there is provided a valve unit 220 which also contains the valve which is closed in the powerless state and which blocks all the pressure vessels 100 which are provided in the underfloor region with respect to the remaining fuel supply installation. Only one fuel rail of the four fuel rails is connected to a fuel line 270 which acts as a refueling line. The two central fuel rails are connected only to adjacent fuel rails.

The term "substantially" (for example, "substantially bending-resistant") includes in the context of the technology disclosed in this instance the precise property or the precise value (for example, "bending-resistant") and in each case tolerances which are insignificant for the function of the property/value (for example, "tolerable deviation from bending-resistant").

The above description of the depicted embodiments is intended only for illustrative purposes and is not intended to limit the invention. In the context of the invention, various changes and modifications are possible without departing from the scope of the invention and the equivalents thereof. For example, in place of three pressure vessels (cf. FIG. 12), any number of pressure vessels 100 can be connected to a fuel rail. In place of one fuel rail or four fuel rails, a different number of fuel rails may also be provided. In one embodiment, a fuel rail may extend over the entire underfloor region.

LIST OF REFERENCE NUMERALS

100 Pressure vessel
120 Fiber-reinforced layer
130 Connection piece
132 Sealing face
134 Securing face
200 Fuel-carrying portion
202 Removal line connection
204 Refueling line connection
210 Rail connection
220, 230 Valve unit
240 Thermally activatable pressure relief device
242 Pressure relief connection
250 Pipe breakage protection valve
260 Plug
270 Fuel line
280 Adapter
290 Pressure reducer
300 Body connection element
302 Inner surface
310 Securing means
400 Clamping means
500 Carrier
600 Metal base sheet
700 Base plate
710 Securing element
P132 Sealing face contact locations
P134 Securing face contact locations
A Angular deviation
L-L Pressure vessel longitudinal axis
V Fuel storage volume

The invention claimed is:

1. A pressure vessel for storing fuel, comprising:
a connection piece for forming a fluid connection between a fuel storage volume of the pressure vessel and an energy converter of a motor vehicle, wherein
the connection piece extends at least partially out of the pressure vessel, wherein
an outer surface of the connection piece has a sealing face and a curved securing face, wherein
the sealing face is configured to seal the fluid connection between the pressure vessel and a fuel-carrying portion of the motor vehicle, wherein
the securing face is provided to secure the pressure vessel to at least one body connection element, wherein
in an installation position of the pressure vessel the sealing face abuts the fuel-carrying portion in first sealing face contact locations, wherein
in the installation position of the pressure vessel, the securing face contacts the body connection element in second securing face contact locations, wherein
an angular deviation is a deviation of the actual installation position of the pressure vessel from a desired installation position with respect to a pressure vessel longitudinal axis, and wherein
the sealing face and the securing face are arranged and constructed in such a manner that an entirety of the sealing face contact locations resulting from different angular deviations and the entirety of securing face contact locations resulting from different angular deviations each have curved faces having at least one common rotation location.

2. The pressure vessel according to claim 1, wherein the securing face and the sealing face are provided laterally on the portion of the connection piece that is located outside of the pressure vessel, and wherein the securing face and the sealing face are arranged opposite each other.

3. The pressure vessel according to claim 1, wherein the sealing face is in the form of a frustoconical face which tapers into the connection piece, and/or wherein the securing face is formed by a surface portion of a spherical segment or a cylinder.

4. The pressure vessel according to claim 1, wherein the connection piece is constructed in an integral manner, and wherein
the connection piece protrudes at least partially into a vessel wall and is surrounded by a fiber-reinforced layer.

5. A pressure vessel system for a motor vehicle, comprising:
at least one pressure vessel according to claim 1;
at least one fuel-carrying portion which is connected in fluid terms to the pressure vessel; and
at least one body connection element for securing the pressure vessel to the body of the motor vehicle; wherein
the fuel-carrying portion serves to fill the pressure vessel with fuel and/or to remove the fuel from the pressure vessel.

6. The pressure vessel system according to claim 5, wherein the fuel-carrying portion and the body connection element clamp the portion of the connection piece which is outside the pressure vessel.

7. The pressure vessel system according to claim 5, wherein
the fuel-carrying portion has a curved and spherical-segment-like outer surface which at least partially contacts the sealing face.

8. The pressure vessel system according to claim 5, wherein
the body connection element has a curved inner face of which a curvature in order to form a contact face substantially corresponds to the curvature of the outer surface of the securing face.

9. The pressure vessel system according to claim 5, wherein the pressure vessel system comprises a plurality of pressure vessels; and wherein the at least one fuel-carrying portion includes a fuel rail which has a plurality of rail connections for connecting the pressure vessels.

10. The pressure vessel system according to claim 9, wherein the fuel rail is substantially bending-resistant.

11. The pressure vessel system according to claim 9, wherein the at least one fuel rail and the at least one body connection element each clamp a plurality of pressure vessels.

12. The pressure vessel system according to claim 9, further comprising:

at least one valve unit is connected to the fuel rail, the at least one valve unit comprising a valve which is closed in a powerless state, wherein valves which are closed in the powerless state are lacking between the fuel storage volume of the pressure vessels and the rail connections.

13. The pressure vessel system according to claim 5, wherein a pipe breakage protection valve is provided in the connection piece of each pressure vessel.

14. The pressure vessel system according to claim 5, wherein at least one thermally activatable pressure relief device is connected to at least one fuel rail and/or to the at least one pressure vessel.

15. A motor vehicle comprising a pressure vessel system according to claim 5, wherein an underfloor region of the motor vehicle is subdivided with at least one carrier into different underfloor installation regions, wherein a fuel rail is included on or in each underfloor installation region, wherein each fuel rail is connected to the at least one pressure.

16. A pressure vessel system for a motor vehicle, comprising:

at least one pressure vessel for storing fuel, comprising:

a connection piece for forming a fluid connection between a fuel storage volume of the pressure vessel and an energy converter of the motor vehicle, wherein the connection piece extends at least partially out of the pressure vessel, wherein an outer surface of the connection piece has a sealing face and a curved securing face, wherein the sealing face is configured to seal the fluid connection between the pressure vessel and a fuel-carrying portion of the motor vehicle, and wherein the securing face is provided to secure the pressure vessel to at least one body connection element;

at least one fuel-carrying portion which is connected in fluid terms to the pressure vessel; and at least one body connection element for securing the pressure vessel to the body of the motor vehicle, wherein the fuel-carrying portion serves to fill the pressure vessel with fuel and/or to remove the fuel from the pressure vessel, and wherein the fuel-carrying portion and the body connection element clamp the portion of the connection piece which is outside the pressure vessel.

17. A pressure vessel system for a motor vehicle, comprising:

at least one pressure vessel for storing fuel, comprising:

a connection piece for forming a fluid connection between a fuel storage volume of the pressure vessel and an energy converter of the motor vehicle, wherein the connection piece extends at least partially out of the pressure vessel, wherein an outer surface of the connection piece has a sealing face and a curved securing face, wherein the sealing face is configured to seal the fluid connection between the pressure vessel and a fuel-carrying portion of the motor vehicle, and wherein the securing face is provided to secure the pressure vessel to at least one body connection element;

at least one fuel-carrying portion which is connected in fluid terms to the pressure vessel; and at least one body connection element for securing the pressure vessel to the body of the motor vehicle, wherein the fuel-carrying portion serves to fill the pressure vessel with fuel and/or to remove the fuel from the pressure vessel, and wherein the fuel-carrying portion has a curved and spherical-segment-like outer surface which at least partially contacts the sealing face.

\* \* \* \* \*